US009436287B2

(12) United States Patent
Ton et al.

(10) Patent No.: US 9,436,287 B2
(45) Date of Patent: Sep. 6, 2016

(54) SYSTEMS AND METHODS FOR SWITCHING PROCESSING MODES USING GESTURES

(71) Applicant: QUALCOMM Incorporated, San Diego, CA (US)

(72) Inventors: Phuong L. Ton, San Diego, CA (US); Evan R. Hildreth, Thornhill (GB); Joel S. Bernarte, San Diego, CA (US); Suzana Arellano, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 499 days.

(21) Appl. No.: 13/835,234

(22) Filed: Mar. 15, 2013

(65) Prior Publication Data

US 2014/0278441 A1 Sep. 18, 2014

(51) Int. Cl.
| | |
|---|---|
| *G06F 3/01* | (2006.01) |
| *G10L 15/26* | (2006.01) |
| *G06F 3/16* | (2006.01) |
| *G06F 3/03* | (2006.01) |
| *G10L 21/00* | (2013.01) |
| *G10L 15/22* | (2006.01) |
| *G06F 3/00* | (2006.01) |

(52) U.S. Cl.
CPC ............ *G06F 3/017* (2013.01); *G06F 3/0304* (2013.01); *G06F 3/167* (2013.01); *G10L 15/22* (2013.01); *G10L 15/26* (2013.01); *G10L 21/00* (2013.01); *G06F 3/005* (2013.01); *G06F 2203/0381* (2013.01); *G10L 2015/223* (2013.01); *G10L 2015/227* (2013.01)

(58) Field of Classification Search
CPC .................. G06F 3/017; G06F 3/167; G06F 2203/0381; G10L 2015/227; G10L 15/22; G10L 15/26; G10L 2015/223; G10L 15/265; G10L 2015/226

See application file for complete search history.

(56) References Cited

U.S. PATENT DOCUMENTS

| | | | |
|---|---|---|---|
| 7,260,529 B1 | 8/2007 | Lengen | |
| 7,369,997 B2 | 5/2008 | Chambers et al. | |
| 8,255,218 B1 | 8/2012 | Cohen et al. | |
| 2003/0028382 A1* | 2/2003 | Chambers et al. | 704/275 |
| 2005/0043954 A1 | 2/2005 | Roth et al. | |
| 2007/0040892 A1* | 2/2007 | Aoki et al. | 348/14.01 |
| 2010/0070268 A1 | 3/2010 | Sung | |
| 2010/0312547 A1 | 12/2010 | Van Os et al. | |
| 2011/0216075 A1 | 9/2011 | Shigeta et al. | |
| 2011/0301943 A1 | 12/2011 | Patch | |
| 2012/0239396 A1 | 9/2012 | Johnston et al. | |
| 2012/0306770 A1* | 12/2012 | Moore et al. | 345/173 |
| 2013/0138424 A1* | 5/2013 | Koenig et al. | 704/9 |
| 2013/0176220 A1* | 7/2013 | Merschon et al. | 345/158 |

OTHER PUBLICATIONS

International Search Report and Written Opinion—PCT/US2014/026273—ISA/EPO—Jun. 20, 2014.

\* cited by examiner

*Primary Examiner* — Nicholas Ulrich

(74) *Attorney, Agent, or Firm* — Kilpatrick Townsend & Stockton LLP

(57) ABSTRACT

Systems and methods for switching between voice dictation modes using a gesture are provided so that an alternate meaning to a dictated word may be applied. The provided systems and methods time stamp detected gestures and detected words from the voice dictation and compare the time stamp at which a gesture is detected to the time stamp at which a word is detected. When it is determined that a time stamp of a gesture approximately matches a time stamp of a word, the word may be processed to have an alternate meaning, such as a command, punctuation, or action.

39 Claims, 13 Drawing Sheets

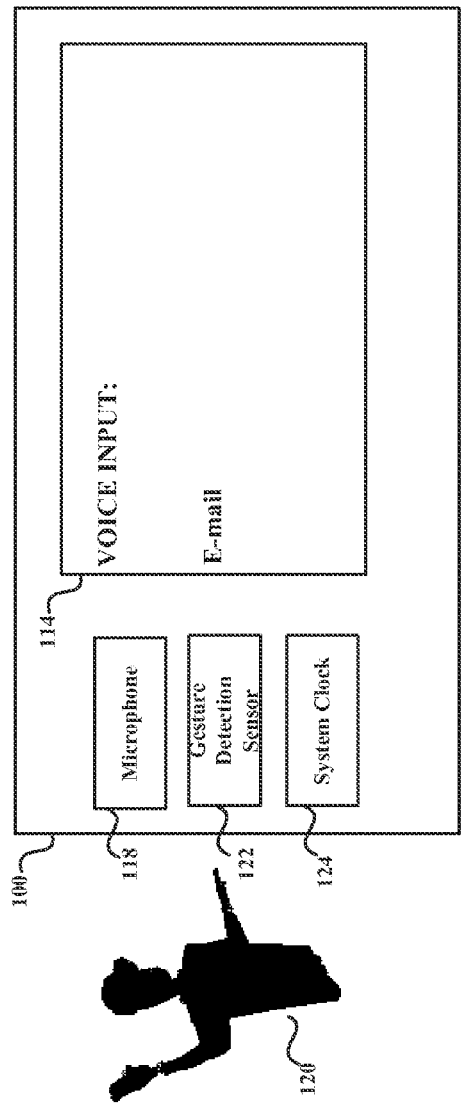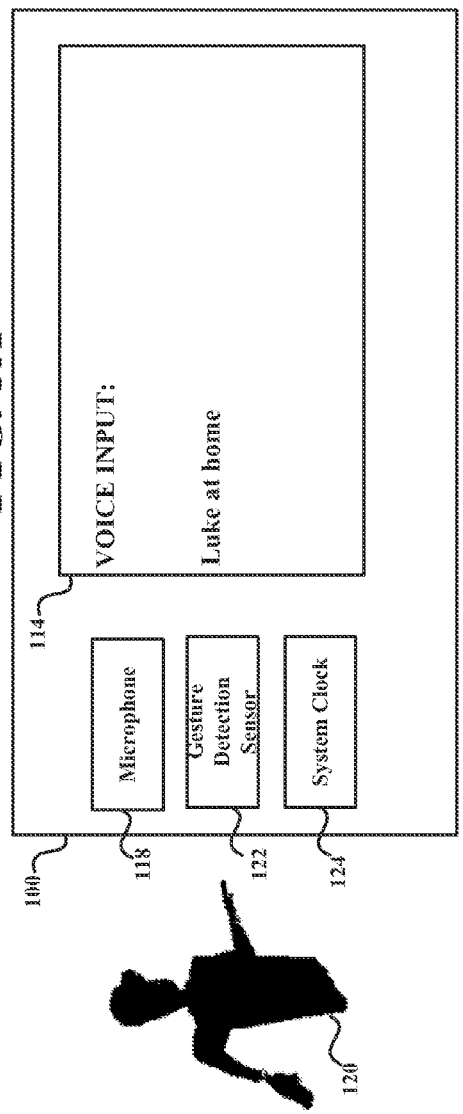

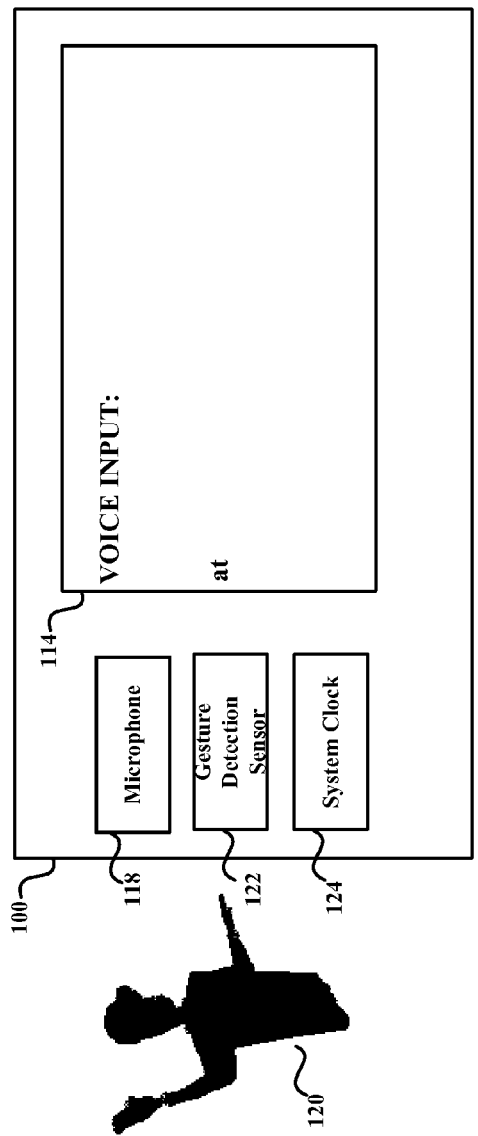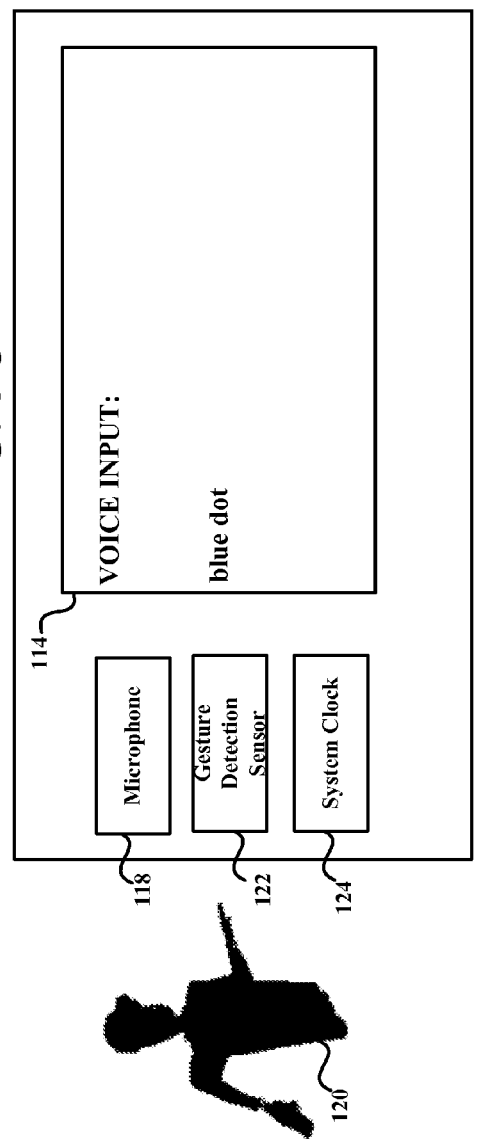

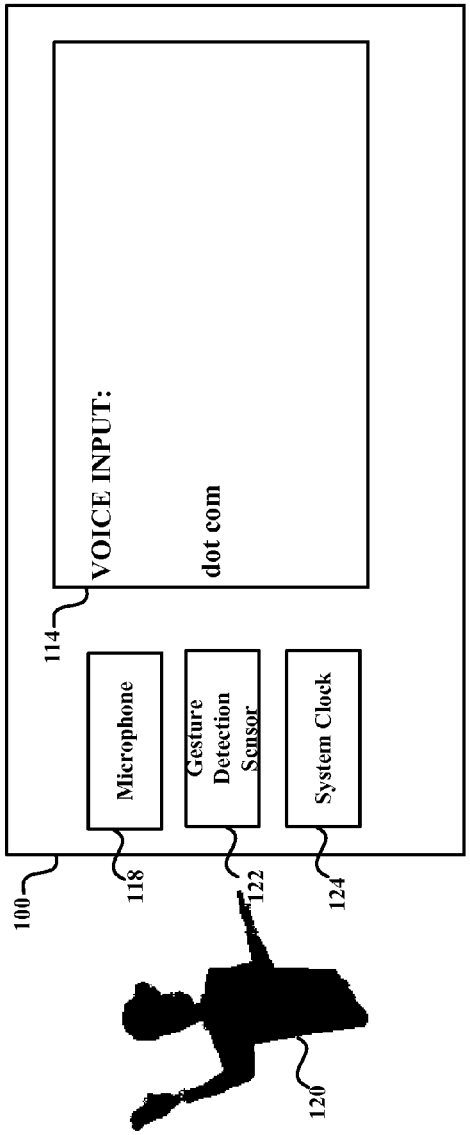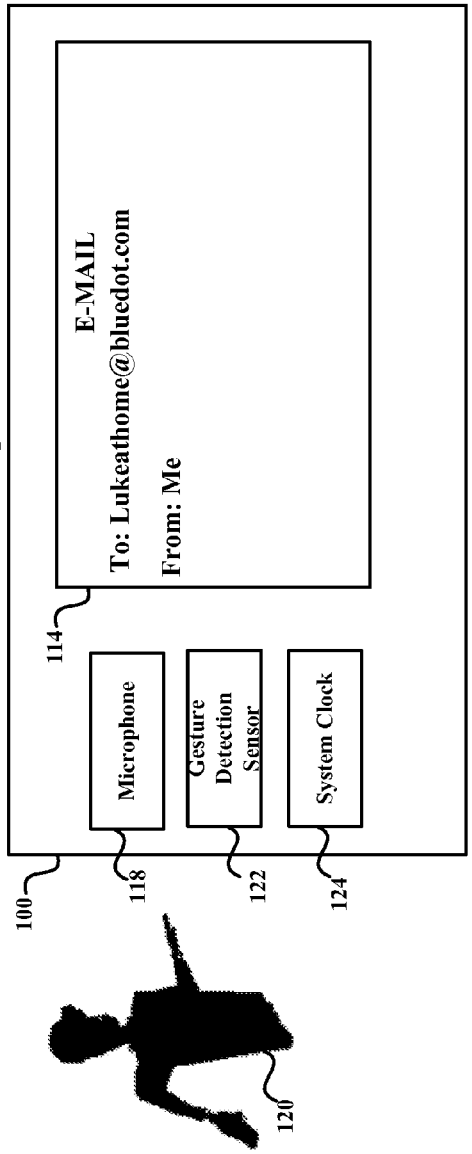

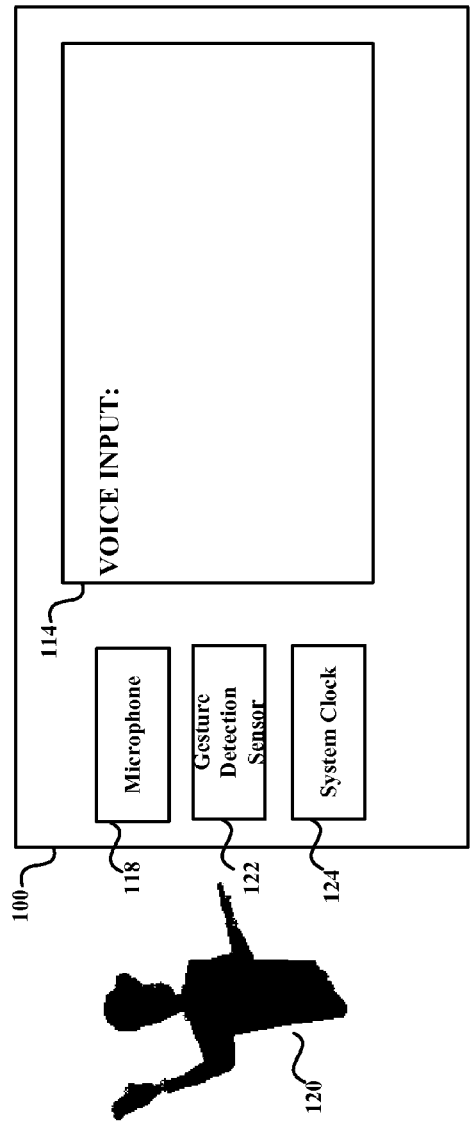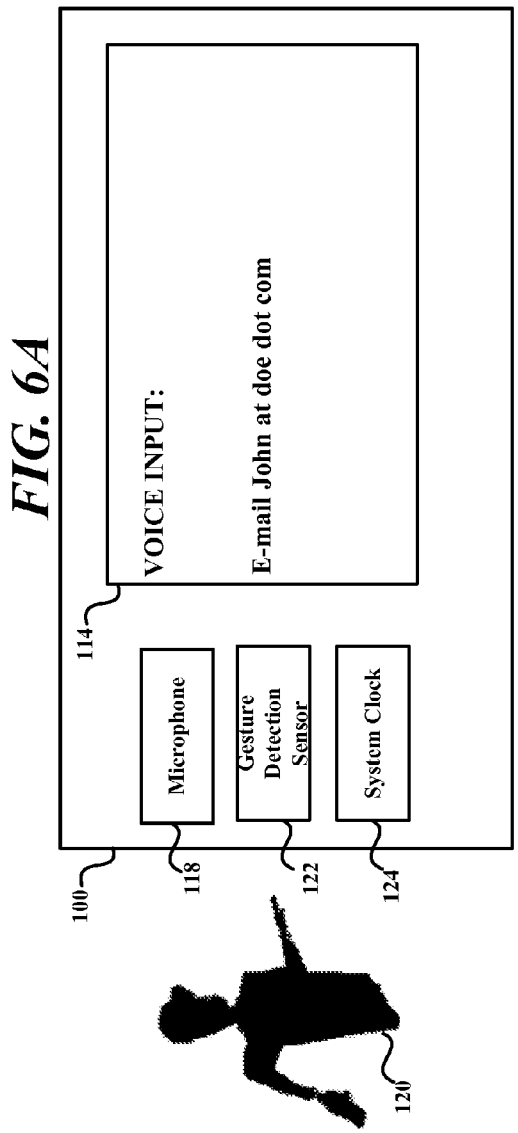

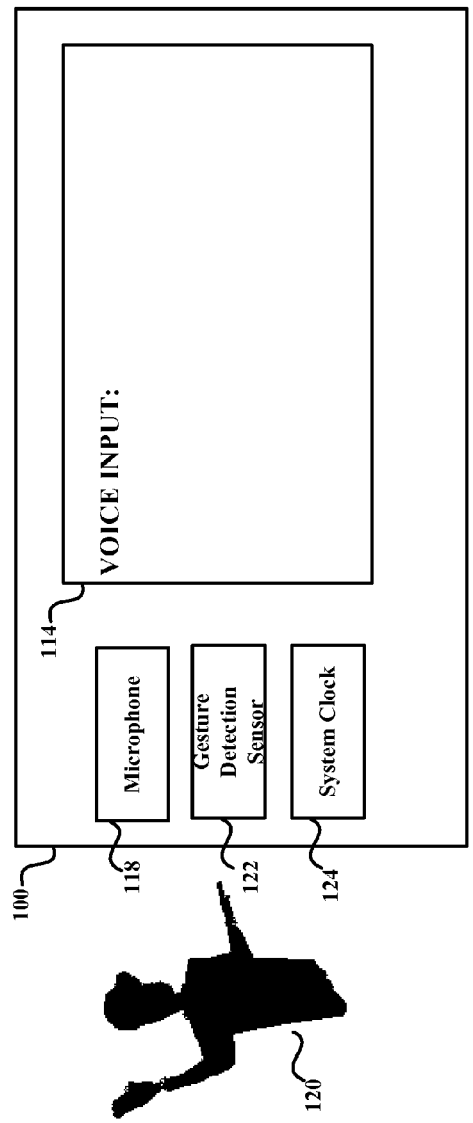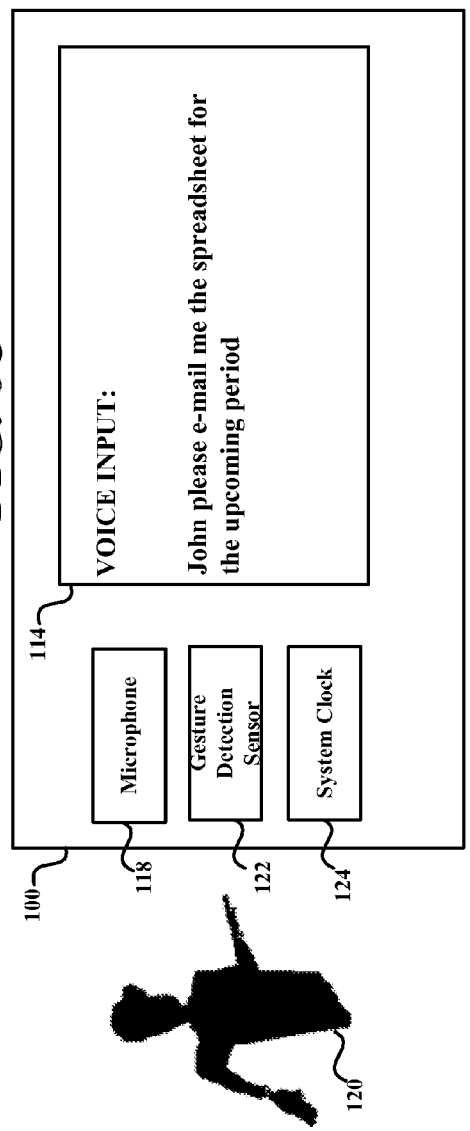

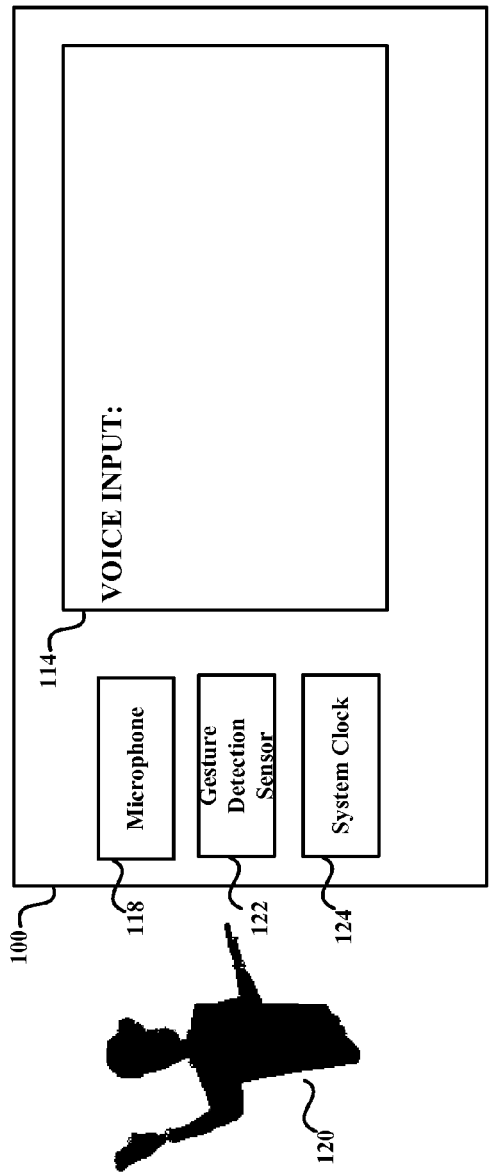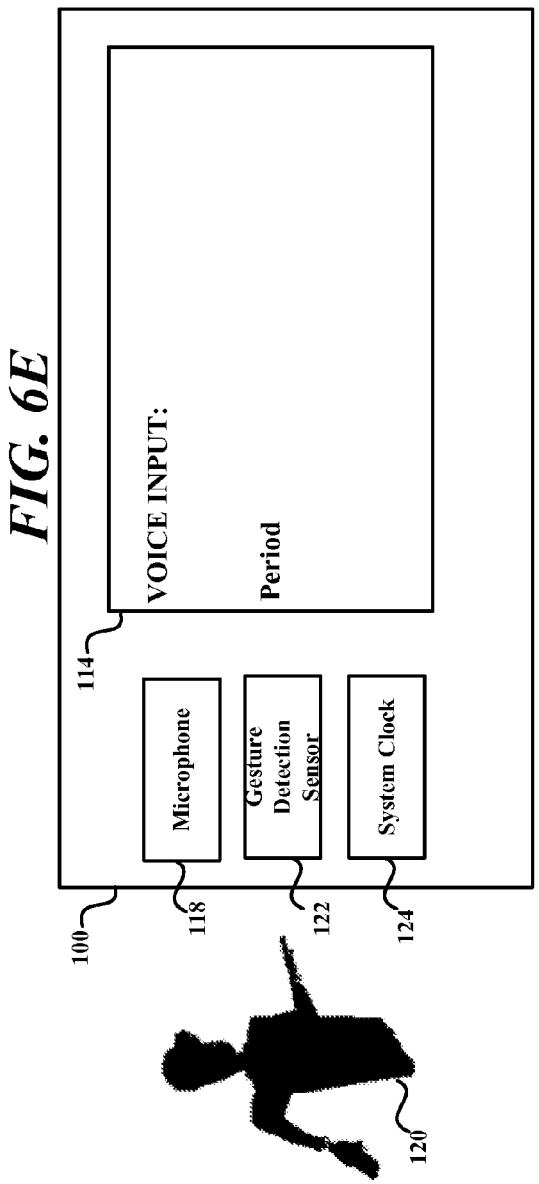

SYSTEMS AND METHODS FOR SWITCHING PROCESSING MODES USING GESTURES

TECHNICAL FIELD

Embodiments disclosed herein are generally directed to systems and methods for switching between modes at a computing device. In particular, embodiments disclosed herein are directed to switching between modes based on a detected gesture.

BACKGROUND

Voice dictation used to mean speaking to a tape recorder or a typist. However, as voice detection systems improve, and systems are better able to process voice into text, voice dictation systems have been implemented in software installed on a computer or mobile device. Further, voice dictation systems are able to process voice into text as a user speaks, providing significant advancements in hands-free and accessibility applications.

One of the difficulties in implementing voice dictation is adapting to a person's natural speech patterns. Current voice dictation systems process full spoken word strings as text and process the text for commands or punctuation. However, it is difficult for many systems to process the text for commands or punctuation. Some systems look for pauses to determine the end of the text and use this pause as a cue that the next string will include a command to be executed on the previous string. If a user pauses in their speech to collect their thoughts or think about what to say next, and the next string includes a word that may be interpreted as a command, a command may be executed despite the user not wanting to execute a command at the same time.

Accordingly, there is a need for systems and methods for improved voice dictation that is able to better account for a user's natural speech patterns and differentiate between different meanings for dictated words, including words that may be commands and/or punctuation.

SUMMARY

Consistent with some embodiments, there is provided a system for processing detected audio waveforms in a first mode and a second mode. The system includes a microphone configured for detecting audio waveforms, a gesture detection sensor configured to detect touchless gestures, and a system clock configured to provide a time stamp to detected audio waveforms and detected touchless gestures. The system also includes one or more processors configured to process a detected audio waveform in the second mode when a time stamp of a detected audio waveform and a time stamp of a detected touchless gesture approximately match.

Consistent with some embodiments, there is further provided a method for processing detected audio waveforms in a first mode and second mode. The method includes steps of detecting, by a microphone, an initial audio waveform input, initiating gesture detection, time stamping the audio waveform input, detecting if a touchless gesture is performed, time stamping a detected touchless gesture, and processing, by one or more processors coupled to the microphone, the audio waveform input in the second mode from about the time stamp of the detected touchless gesture until about a time when a touchless gesture is no longer detected. The provided method may also be embodied as instructions in a computer-readable medium.

Consistent with some embodiments, there is further provided a system for processing detected audio waveforms in a first mode and a second mode. The system includes means for detecting an audio waveform input and time stamping the audio waveform input, means for detecting a touchless gesture and time stamping the detected touchless gesture, and means for selectively processing the audio waveform input in the second mode when the time stamp of the audio waveform input approximately matches the time stamp of the detected touchless gesture.

BRIEF DESCRIPTION OF THE DRAWINGS

FIGS. 3A-3F illustrate an example of a system processing detected audio waveforms in a first mode and a second mode based on a detected gesture, consistent with some embodiments.

FIGS. 6A-6G illustrate an example of a system processing detected audio waveforms in a first mode and a second mode based on a detected gesture, consistent with some embodiments.

Figure 1:
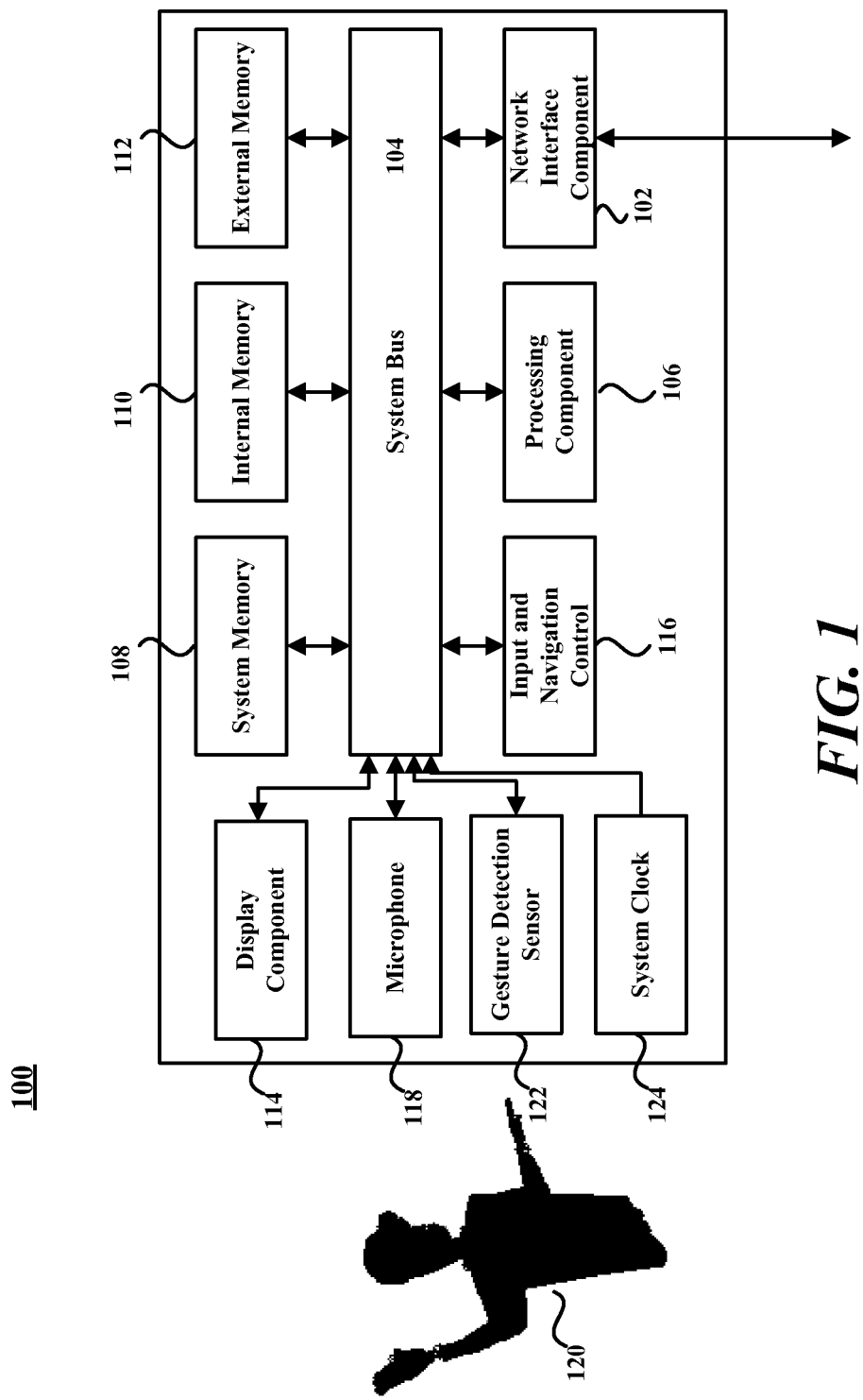
FIG. 1 is a diagram illustrating a processing device 100, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

FIG. 1 is a diagram illustrating a processing device 100, consistent with some embodiments. Processing device 100 may be a mobile device such as a smartphone such as an iPhone™ or other mobile device running the iOS™ operating system, the Android™ operating system, a BlackBerry™ operating system, the Microsoft® Windows® Phone operating system, Symbian™ OS, or webOS™ or a mobile device which does not implement an operating system. Processing device 100 may also be a tablet computer, such as an iPad™ or other tablet computer running one of the aforementioned operating systems. Processing device 100 may also be PCs or laptops or netbooks, a set-top boxes (STB) such as provided by cable or satellite content providers, or a video game system consoles such as the Nintendo® Wii™, the Microsoft® Xbox 360™, or the Sony® PlayStation™ 3, or other video game system consoles. In some embodiments, processing device 100 is implemented in an automobile, for example in an entertainment center or console of an automobile, or is included or implemented in a healthcare device. According to some embodiments, processing device 100 may be implemented using any appropriate combination of hardware and/or software configured for receiving and capturing audio input and detecting a gesture. In particular, processing device 100 may include any appropriate combination of hardware and/or software having one or more processors and capable of reading instructions stored on a non-transitory machine-readable medium for execution by the one or more processors for receiving and capturing audio input and detecting a gesture. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which one or more processors or computer is adapted to read.

Processing device 100 may include network interface component 102 configured for communication with a network. Consistent with some embodiments, network interface component 102 may be configured to interface with a coaxial cable, a fiber optic cable, a digital subscriber line (DSL) modem, a public switched telephone network (PSTN) modem, an Ethernet device, and/or various other types of wired network communication devices. Network interface component 102 may also include one or more wireless transceivers, wherein each wireless transceiver may include an antenna that is separable or integral and is capable of transmitting and receiving information according to a different wireless networking protocol, such as Wi-Fi™, 3G, 4G, HDSPA, LTE, RF, NFC. Consistent with some embodiments, processing device 100 includes a system bus 104 for interconnecting various components within processing device 100 and communication information between the various components. In some embodiments, the bus 104 is implemented in a System on Chip (SoC) and connects various elements or components on the chip and/or cores of one or more processors. Components may include a processing component 106, which may be one or more processors, central processing units (CPUs), image signal processors (ISPs), micro-controllers, or digital signal processors (DSPs), and audio signal processors, which may include analog and/or digital audio signal processors. Components may also include a system memory component 108, which may correspond to random access memory (RAM), an internal memory component 110, which may correspond to read only memory (ROM), and an external or static memory 112, which may correspond to optical, magnetic, or solid-state memories. Consistent with some embodiments, processing device 100 may also include a display component 114 for displaying information to a user. Display component 114 may be a liquid crystal display (LCD) screen, an organic light emitting diode (OLED) screen (including active matrix AMOLED screens), an LED screen, a plasma display, or a cathode ray tube (CRT) display. Display component 114 may be integrated with processing device 100, or may be separate from processing device 100 and coupled to processing device 100. Processing device 100 may also include an input and navigation control component 116, allowing for a user to input information and navigate along display component 114. An input and navigation component 116 may include, for example, a keyboard or key pad, whether physical or virtual, a mouse, a trackball, or other such device, or a capacitive sensor-based touch screen. Processing device 100 may include more or less components than shown in FIG. 1 according to some embodiments. For example, processing device 100 may include any one or two of system memory component 108, internal memory component 110, and external memory component 112. Moreover, components shown in FIG. 1 may be directly coupled to one or more other components in FIG. 1, eliminating a need for system bus 104. In general, the components shown in FIG. 1 are shown as examples of components in a processing device 100 capable of performing embodiments disclosed herein. However, a processing device 100 may have more or fewer components and still be capable of performing some embodiments disclosed herein.

Processing device 100 also includes a microphone 118 for detecting and receiving audio input from, for example, user 120. According to some embodiments, microphone 118 may be configured to detect audio, such as a voice, which is then transmitted to processing component 106 for processing and to any of memories 108, 110, and 112 for storage. In some embodiments, microphone 118 may be configured for detecting a voice from user 120 for use in dictation. Microphone 118 may be integrated with processing device 100 or may be separate and coupled to processing device 100 by a cable or wireless coupling. According to some embodiments, microphone 118 detects audio waveforms associated with a voice of user 120, and translates the detected waveforms into one or more electrical signals that are transmitted to processing component 106 for processing according to instructions stored in any of memories 108, 110, and 112. In some embodiments, microphone 118 may include an acoustic-to-electric transducer or sensor that converts the detected audio waveforms into the one or more electrical signals.

Processing device 100 may also include a gesture detection sensor 122. Gesture detection sensor 122 may be any sensor capable of detecting a gesture made by user 120. According to some embodiments, gesture detection sensor 122 may be a camera, an ultrasound transducer, a light pipe shadow detector, an infrared sensor, and/or an ambient light sensor, or other sensor configured to detect gestures. In some embodiments, a gesture may be a touchless gesture or interaction that may be detected by gesture detection sensor 122, where the gesture made by user 120 may be detected without the user having to touch gesture detection sensor 122. Examples of a touchless gesture may include a hand pose, such as a raised hand, or a hand cover gesture, where a hand of user 120 covers gesture detection sensor 122. In some embodiments, gesture detection sensor 122 may include microphone 118 or a separate microphone that is sensitive to ultrasonic frequencies. For embodiments that use a camera to detect a gesture, the camera may be a visible light camera or a depth-sensing camera, such as the Microsoft® Xbox™ Kinect™ camera. The camera may also be configured to detect infrared (IR) light or ultraviolet (UV) light. Gesture detection sensor 122 may also be a stereo camera, a time-of-flight (ToF) camera, or other camera capable of detecting a gesture made by user 120. Gesture detection sensor 122 may also be a Nintendo® Wii™ WiiMote™, or Sony® PlayStation™ Move™ in some embodiments. In some embodiments, gesture detection sensor 122 may include one or more gesture detection sensors, such as described above, working in combination to detect gestures made by user.

According to some embodiments, gesture detection sensor 122 may be configured to detect a gesture made by user 120 for switching the processing of audio by processing component 106 from a first or normal mode into a second or alternate mode. According to some embodiments, gesture detection sensor 122 may be inactive until microphone 118 detects audio waveforms for processing to conserve power. Moreover, gesture detection sensor 122 may be inactive until a detected audio waveform is determined to be a human voice by processing component 106. In some embodiments, a gesture detection procedure for use with the sensor 122 is enabled, for example by the processing component 106, in response to an audio waveform and/or a human voice being detected. In some such embodiments, the sensor 122 may remain on in some circumstances even when an audio waveform and/or a human voice isn't detected by the microphone 118, but detection of one or more certain gestures may be enabled and/or the sensor 122 may be operated at a higher duty cycle or operationally affected in one or more other ways. Further, gesture detection sensor 122 may be configured to capture frames of data, including image data, that may be analyzed for the presence and/or absence of a gesture. In some embodiments, gesture detection sensor 122 may be configured to capture a predetermined number of frames per second that may be increased or decreased based on such factors as desired detection accuracy and power conservation. For example, capturing more frames per second may provide greater accuracy, while draining power more quickly, while capturing less frames per second may provide less accuracy, but will drain power less quickly. Further, gesture detection sensor 122 may be configured to look for a gesture in the frames at a variable rate that may be increased in order to improve accuracy at the expense of power, but may be decreased in order to improve power conservation at the expense of accuracy. In some embodiments, gesture detection sensor 122 may be configured to look for gestures in one out of every eight frames to conserve power, but this rate may be increased or decreased to improve accuracy or power conservation. In some embodiments, the variable rate is increased in response to the microphone 118 detecting an audio waveform and/or a voice. Moreover, the frames may be stored in a buffer in gesture detection sensor 122 or in any of memories 108-112 and may be accessed for greater accuracy in gesture detection if needed. That is, if gesture detection sensor 122 is configured to look for gestures in only one out of every eight frames, the other seven frames may be stored in a buffer or memory and accessed by gesture detection sensor 122 or processing component 106 for greater accuracy to determine the presence of a gesture or for resolving a possible or partial detected gesture. Further, frames may be buffered to account for a user not gesturing at a time that exactly correlates with a certain spoken word, for example due to a delay between speaking an gesturing.

Processing device 100 also includes a system clock 124, which provides a clock and timing to the components of processing device 100, and may be configured to provide a time stamp for detected audio waveforms and detected gestures. Although the components of processing device 100 are shown as being integral with processing device 100, the components are not so limited and may be separate from and external to processing device 100, and coupled to processing device 100 and system bus 104 via a wired or wireless coupling.

Consistent with some embodiments, user 120 may use device 100 for voice dictation, with microphone 118 configured to detect the audio waveforms associated with a string of words dictated by user, which are converted to electrical signals and transmitted to processing component 106 for processing. The electrical signals associated with the audio waveforms may be associated with predetermined meanings corresponding to words, commands, or punctuation, defined in a dictionary stored in any of memories 108, 110, and 112, and processing component 106 may match the electrical signal associated with the audio waveform to the meaning, and output the corresponding meaning to text. As noted above, one of the difficulties in implementing voice dictation is differentiating between words or strings of words that have different meanings. Words such as "send", "delete", "message", "e-mail", and "forward" are all words that could be interpreted as commands or instructions related to e-mail and messaging functionalities. Similarly, words such as "dot", "period", "at", and "comma" could be interpreted as words or punctuation.

Figure 2A:
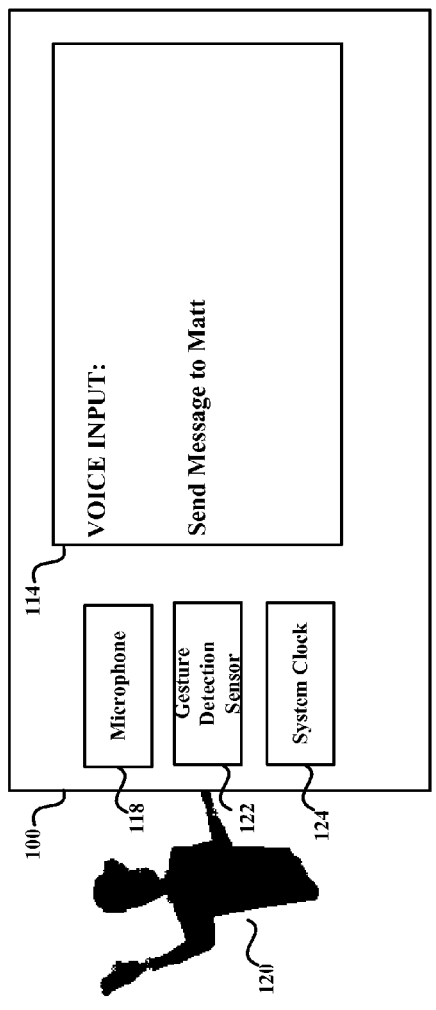
FIGS. 2A-2C illustrate an example of a system for processing detected audio waveforms in a first mode and a second mode based on a detected gesture, consistent with some embodiments.
Figure 2B:
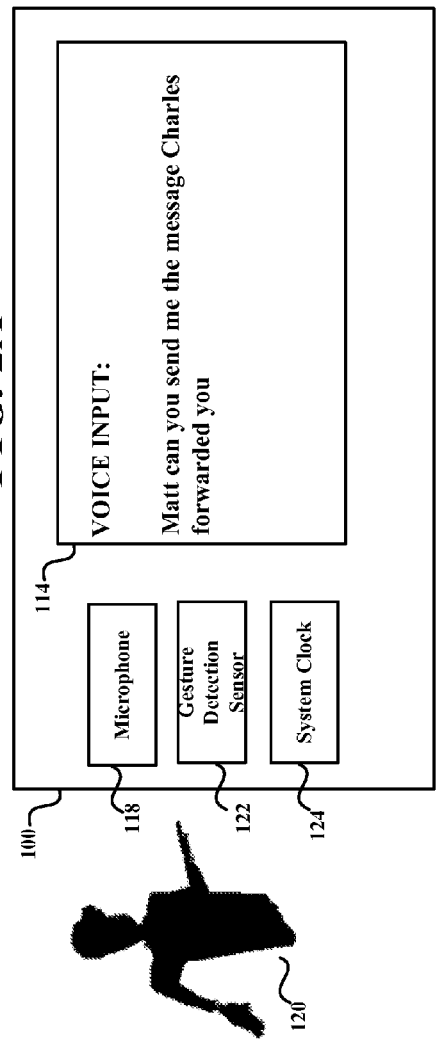
Figure 2C:
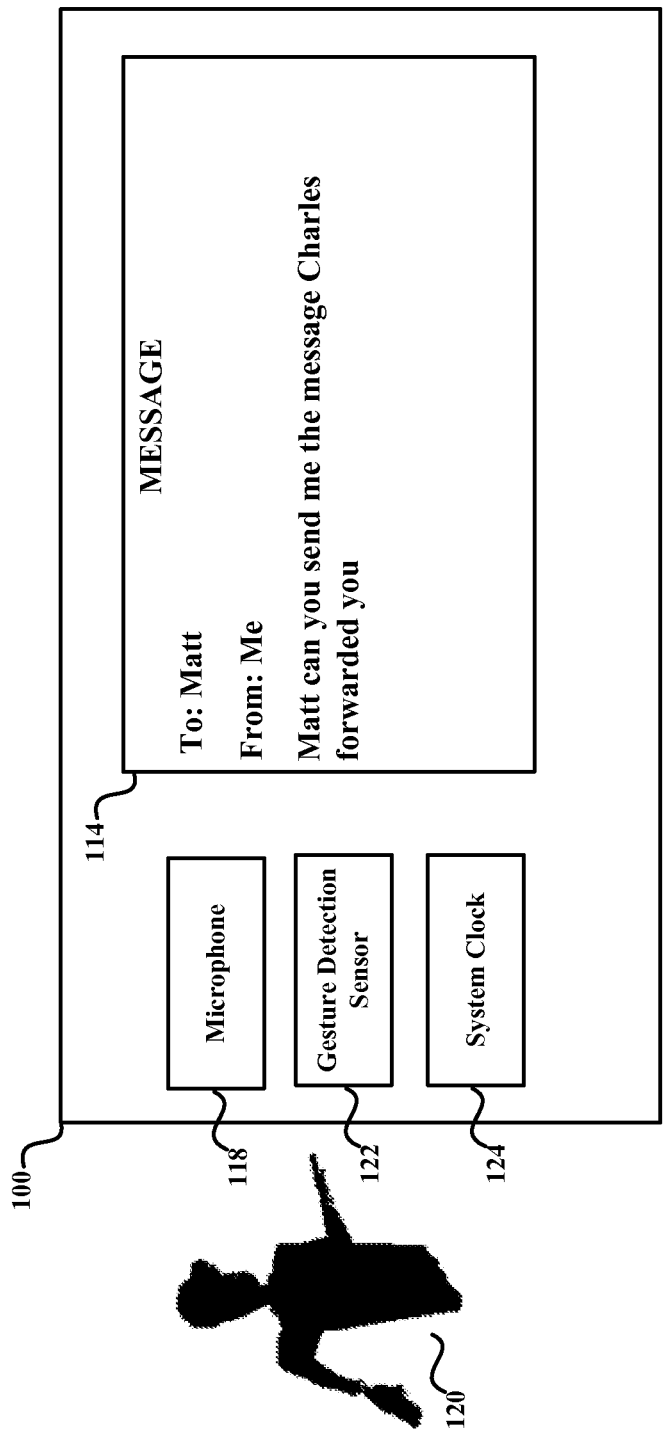

FIGS. 2A-2C illustrate an example of a system for processing detected audio waveforms in a first mode and a second mode based on a detected gesture, consistent with some embodiments. As shown in FIG. 2A, user 120 is dictating to device 100. According to some embodiments, microphone 118 detects audio waveforms associated with a voice of user 120, electrical signals are generated by the audio waveforms that are processed by processing component 106 based on instructions stored in any of memories 108, 110, and 112. In particular, processing component 106 compares each electrical signal compared to a known signal representing a meaning corresponding with a particular word, command, punctuation, or string of words, in a dictionary stored in any of memories 108, 110, and 112. Consistent with some embodiments, the dictionary may be prepared by a third party or may be a known dictionary associated with common voice dictation systems. Moreover, dictionary may be user-editable where user may be capable of recording audio waveforms and defining the meanings for the recorded audio waveforms.

When processing component 106 matches the electrical signals to an electrical signal in the dictionary, the meaning associated with the electrical signal may be displayed on display component 114 or other action may be taken by the device 100. The meaning may be a word or punctuation, which may be displayed on display component 114 or stored in one of the memories 108-112 for later recall or transmission, for example, or a command, which may instruct processing component 106 to perform an action. Consistent with some embodiments, electrical signals associated with audio waveforms corresponding to a voice may have a second or alternate meaning. Moreover, user 120 may activate this alternate meaning by making a gesture that is detected by gesture detection sensor 122 to switch the voice dictation system to process electrical signals corresponding to the detected audio waveforms in an alternate mode that uses the alternate meaning. When gesture detection sensor 122 detects a gesture, an electrical signal is generated that is processed by processing component 106 based on instructions stored in any of memories 108, 110, and 112, such that a corresponding electrical signal generated by detected audio waveforms is processed in another mode and given an alternate meaning. For example, if user 120 makes a gesture, such as shown in FIG. 2A at the same time as speaking the words "Send Message To Matt", processing component 106 processes one or more of the words in the string according to an alternate mode initiated by the gesture. According to some embodiments, user 120 may be provided with audio or visual feedback that is displayed by display component 114 of device 100 or emitted by a speaker (not shown) of device 100 that informs user that detected audio waveforms will be processed in an alternate mode.

According to some embodiments, processing component 106 will time stamp each detected audio waveform based on a time provided by system clock 124. In some embodiments, a time stamp will be associated with a detected audio waveform based on a detected small pause indicative of a space between individual words. In some embodiments, each phoneme or syllable of the detected audio waveform may be time stamped. Moreover, in some embodiments the detected audio waveform may be periodically time stamped based on a period that may be every second or a certain fraction of a second. Processing component 106 will also time stamp the detected gesture based on a time provided by system clock 124. Processing component 106 will then compare the time stamps of the detected audio waveforms and the detected gesture, and when one or more detected audio waveforms are detected during a time interval in which the gesture is detected, processing component 106 will process the detected word according to an alternate mode. Consistent with some embodiments, the time interval may be an interval that includes a time period before and after the gesture is detected based on a reasonable tolerance to account for latency. In some embodiments, the latency may be a due to a delay between when user 120 makes the gesture and speaks, and/or known lag of processing device 100 or gesture detection sensor 122, whether caused by hardware or software. In some embodiments, processing component 106 may be configured to learn dictation patterns of user 120, such as how often a user corrects dictated words, how fast or slow user 120 speaks, and how much delay there is between when user 120 makes the gesture and when user 120 speaks, and vice versa. Based on this leaning, processing component 106 may be able to provide an adaptive or learned latency. The time interval may not only be to account for latency but also may be to provide user 120 a time interval in which to correct what was said or interpreted, in some embodiments.

Consistent with some embodiments, audio waveforms detected by microphone 118 may be buffered such that the detected audio waveforms may be processed in one or more modes based on a gesture detected by gesture detection sensor 122. For example in a first mode, the buffered audio waveforms may be processed by the processing component to have a first meaning, which may correspond to text that is displayed by display component 114. In a second mode activated by a gesture detected by gesture detection sensor 122, the buffered audio waveforms may have a second meaning that is different from a first meaning. According to some embodiments, the second mode may correspond to a command or action that is to be performed by processing component 106. In some embodiments, some of the buffered audio waveforms do not have a different meaning in the second mode and are processed the same as in the first mode. The buffered audio waveforms may be processed by processing component 106 according to the time stamp associated with the audio waveform such that processing component 106 selectively processes the buffered audio waveforms in a first mode or a second mode based on whether a gesture is detected by gesture detection sensor 122 at a corresponding time. In some embodiments, processing in the second mode comprise correlating the audio waveform to a different output, such as punctuation instead of text. In other embodiments, the audio waveform is correlated to the same output, but the output is translated in the second mode, for example to translate the word "period" into a punctuation symbol. In some embodiments, audio waveforms are stored in the buffer for a short time before being interpreted so as to allow the user to cancel, edit, and/or correct the audio waveform.

As shown in FIG. 2A, based on the audio waveforms detected by microphone 118 from user 120, display component 114 displays the text of "Send Message to Matt". However, since user 120 is making a gesture, which may be detected by sensor 122, processing component 106 can match, within a reasonable tolerance, the time when user 120 is making the gesture and the time when the audio waveforms are detected by comparing a time stamp of the detected gesture and the timestamp of the detected audio waveforms, and process the detected audio waveforms according to a second or alternate mode, which may give alternate meanings to some of the detected audio waveforms while some of the detected audio waveforms may have the same meaning. Consistent with some embodiments, the detected audio waveforms shown in FIG. 2A could be processed such that the detected audio waveform corresponding to the dictated words "Send Message to Matt" is processed as command for sending a message to a contact named Matt.

In some embodiments, audio waveforms produced by user 120 which may correspond to words dictated by user, may be processed in real-time or near real-time for every word, represented as one or more near-continuous audio waveforms with a short pause on either side. In some embodiments, the audio waveforms may be processed in segments, such that a segment of audio waveforms lasting a predetermined amount of time is processed at once. In some embodiments, the predetermined amount of time is chosen to represent an average time that user 120 takes to speak a word. The predetermined amount of time may be adaptive and change through learning as user 120 uses device 100. In some embodiments, audio waveforms may be processed after a short pause is detected, the pause being indicative of a pause between words or phrases. In some embodiments, the audio waveforms are processed periodically, such as every second or every five seconds. In some embodiments, the detected audio waveforms may be buffered. In some embodiments, the detection of a gesture by gesture detection sensor 122 may cause all audio waveforms to be loaded into or out of the buffer and then processed by processing component 106 to determine a meaning. For example, the audio waveforms stored in the buffer may be loaded out of the buffer and processed in a second mode and associated with a second meaning when a gesture is detected by gesture detection sensor 122, while incoming audio waveforms are stored in the buffer. Then, when a gesture is no longer detected by gesture detection sensor 122, or a subsequent gesture is detected which signal processing component 106 to stop processing in a second mode and to process in a first mode, the audio waveforms stored in the buffer are loaded out of the buffer and processed in the first mode and associated with a first meaning. In some embodiments, time stamps at either end of a string of audio waveforms may be used to interpolate the time stamps that could be associated with individual words or sounds within the string of audio waveforms.

As shown in FIG. 2B, user 120 stops making the gesture and, thus, the time at which user stops making the gesture will be time stamped according to the time provided by system clock 124 based on information from the sensor 122. User 120 may continue speaking after ceasing to gesture and say "Matt can you send me the message Charles forwarded you." Processing component 106 will receive the electrical signals associated with the detected audio waveforms corresponding to this word string, and analyze the time stamp associated with the detected audio waveforms to determine if a gesture was also detected by gesture detection sensor 122 at the same time. Since user 120 was not making the gesture, a gesture would not have been detected by gesture detection sensor 122, there would not be any detected gestures having a time stamp that corresponds to the time stamp with the detected audio waveforms, and processing component 106 would process the detected audio waveforms in a first mode, wherein a first meaning would be given to the electrical signals associated with the detected audio waveforms. The first meaning may be the text associated with the detected audio waveforms.

FIG. 2C shows the result of FIGS. 2A and 2B. As shown in FIG. 2C, display component 114 of device 100 displays a message to Matt that includes the text "Matt can you send me the message Charles forwarded you." Without using a gesture to switch between a first, normal mode, and a second, alternate mode that gives alternate meanings, the detected audio waveforms may have been processed in a number of different ways that would be inconsistent with what is shown in FIG. 2C. For example, processing component 106 may have processed any of the words "send", "message", or "forward" in "forwarded" as a command, resulting in an inaccurate message being sent or forwarded. However, by correlating a detected gesture with detected audio waveforms, and matching the time stamp of the detected gesture to a time stamp of the detected audio waveforms, processing component 106 understands when user 120 wants the detected audio waveforms to be processed in an alternate mode to give the detected audio waveforms an alternate meaning, and when user wants the detected audio waveforms to be processed in a first, normal mode, to give the detected audio waveforms a first, normal meaning.

FIGS. 3A-3F illustrate an example of a system processing detected audio waveforms in a first mode and a second mode based on a detected gesture, consistent with some embodiments. As shown in FIG. 3A, user 120 may dictate a word string to device 100 and use a gesture to switch between a first, or normal mode, and a second, alternate mode, wherein detected audio waveforms may be given an alternate meaning. Consistent with some embodiments, an electrical signal associated with a detected audio waveform from user 120 may be associated with one or more meanings in a dictionary, where a user may switch from a first or normal meaning to an alternate meaning by the use of gesture. The first or normal meaning may correspond to text associated with the electrical signal corresponding to a detected audio waveform of a word in a word string, and an alternate meaning corresponding to a command or punctuation. For example, microphone 118 detects audio waveforms from user 120 which generates an electrical signal at a time stamp determined by system clock 124. In a first mode, processing component 106 may process the electrical signal to generate the text "E-mail" as shown in FIG. 3A. However, gesture detection sensor 122 detects user 120 making a gesture having a time stamp determined by system clock 124. Processing component 106 receives a signal corresponding to the detected gesture, notes the time stamp, and processes the electrical signal from microphone 118 at about the same time stamp according to an alternate mode. Consistent with some embodiments, the alternate mode for "E-mail" may be processed by processing component 106 as a command to generate an E-mail message.

As shown in FIG. 3B, microphone 118 detects audio waveforms from a word string at a time stamp determined by system clock 124 that generates an electrical signal that may be processed as corresponding to the text of "Luke at home." Since a gesture is not detected by gesture detection sensor 122 at the corresponding time stamp, processing component 106 will process the electrical signal according to a first or normal mode and apply a normal meaning to the word string. As shown in FIG. 3C, microphone 118 detects an audio waveform from the word spoken by user 120 at about a time stamp determined by system clock 124 that generates an electrical signal that may be processed as corresponding to the text of the word "at" in a normal mode. However, gesture detection sensor 122 also detects a gesture at about the corresponding time stamp, and processing component 106 will process the electrical signal according to an alternate mode. Consistent with some embodiments, in the alternate mode, the meaning for the word "at" may be a punctuation mark, namely "@".

As shown in FIG. 3D, microphone 118 detects audio waveforms from a word string at a time stamp determined by system clock 124 that generates an electrical signal that may be processed as corresponding to the text of "blue dot" in a normal mode. Since a gesture is not detected by gesture detection sensor 122 at about the corresponding time stamp, processing component 106 will process the electrical signal according to a first or normal mode. As shown in FIG. 3E, microphone detects audio waveforms from the word at spoken by user 120 at a time stamp determined by system clock 124 that generates an electrical signal that may be processed as corresponding to the text of the word "dot com". However, gesture detection sensor 122 also detects a gesture at about the corresponding time stamp, and processing component 106 will process the electrical signal according to an alternate mode. Consistent with some embodiments, the meaning in the alternate mode for the word "dot" may be processed as a punctuation mark, namely ".", and there may not be any meaning in the alternate mode for the word "com".

FIG. 3E illustrates the result of FIGS. 3A-3E. As shown in FIG. 3E, by combining audio detection and gesture detection to switch modes, device 100 has generated an e-mail that is to be sent to the e-mail address "Lukeathome@bluedot.com". Conventional systems, however, may have difficulties in inferring whether the words "at" and "dot" should be a word or a punctuation mark. However, by correlating a detected gesture with detected audio waveforms, and matching the time stamp of the detected gesture to the detected audio waveforms, processing component 106 understands when user 120 wants the detected audio waveforms to be processed in an alternate mode to give the detected audio waveforms an alternate meaning, and when user wants the detected audio waveforms to be processed in a first or normal mode to give the detected audio waveforms a normal meaning.

Figure 4:
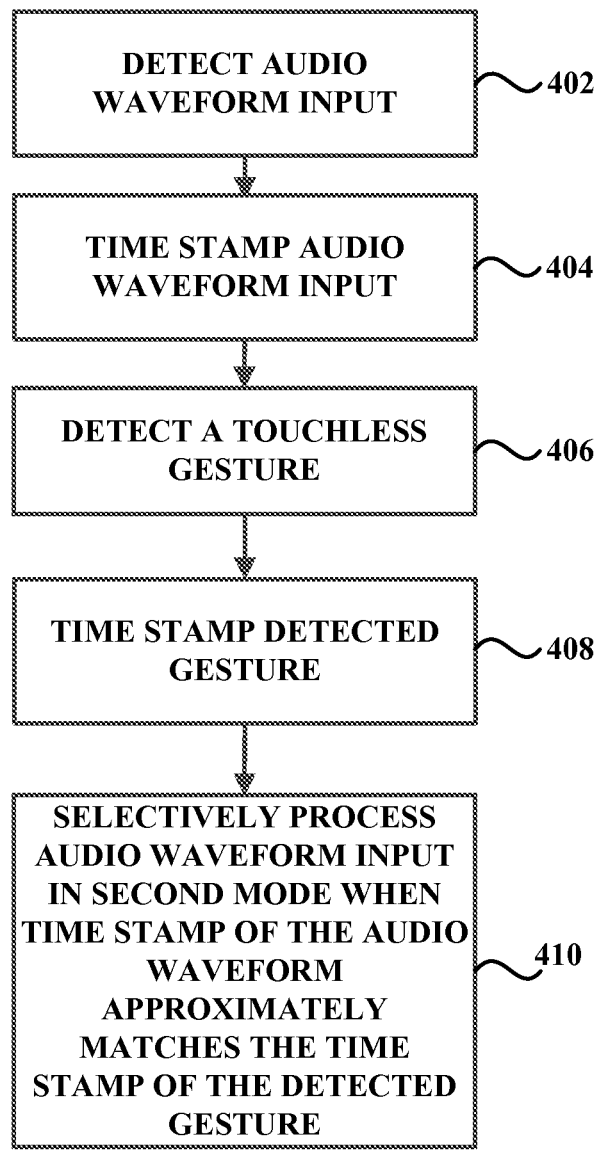
FIG. 4 is a flowchart illustrating a method of processing detected audio waveforms in a first mode and a second mode, consistent with some embodiments.

FIG. 4 is a flowchart illustrating a method of processing detected audio waveforms in a first mode and a second mode, consistent with some embodiments. For the purpose of illustration, FIG. 4 will be described with reference to any of FIGS. 1, 2A-2C, and 3A-3F. The method shown in FIG. 4 may be embodied in computer-readable instructions for execution by one or more processors in processing component 106 of device 100. As shown in FIG. 4, microphone 118 may detect an audio waveform input from user 120 (402). According to some embodiments, the audio waveform input may be a voice of user 120 spoken to device 100 for the purposes of voice dictation or voice commanding device 100. The audio waveform detected by microphone 118 may generate an electrical signal that can be processed by processing component 106 according to instructions in any of memories 108, 110, and 112, to determine a meaning of the electrical signal based on a dictionary of meanings. The detected audio waveform input may then be time stamped according to a time received from system clock 124 (404).

Processing component 106 may then process the detected audio waveform according to a normal or first mode. According to some embodiments, the first mode may correspond to a voice dictation mode, where the detected audio waveforms are translated into text that is displayed by display component 114 based on a first meaning associated with the detected audio waveform.

Gesture detection sensor 122 may then detect a touchless gesture (406). The detected gesture may then be time stamped according to a time received from system clock 124 (408). Processing component 106 may then process the detected audio waveform in a second mode when the time stamp of the audio waveform approximately matches the time stamp of the detected gesture (410). According to some embodiments, processing the detected audio waveform input in a second mode may include processing the detected audio waveform input in a second mode, such as a command or punctuation mode, such that a second meaning corresponding to an electrical signal generated by the detected audio waveform is used by processing component 106. The second meaning may correspond to a command, punctuation, or a homophone of a word.

Moreover, different modes may correspond to different detected touchless gestures. For example, in some embodiments, an engagement gesture that includes user 120 raising their arm with palm facing device 100 may, when detected by gesture detection sensor 122, instruct processing component 106 of device 100 to process detected audio waveforms in a command or punctuation mode. In some embodiments, a cover gesture that includes user 120 covering gesture detection sensor 122 with their hand may instruct processing component 106 of device 100 to process detected audio waveforms in a command or punctuation mode. These gestures may also be understood by device 100 as instructing processing component 106 to process detected audio waveforms in other modes besides a command or punctuation mode. Other modes may include a correction mode, where user 120 may make a gesture to indicate that they want to correct one or more words, letters, symbols, or other text displayed on display component 114 corresponding to detected audio waveforms spoken by user 120. For example, a short left swipe detected by the sensor 122 may be interpreted by the processing component 106 to overwrite pervious word in some embodiments. Another mode may include a literal or phonetic pronunciation modes, where user 120 may make a gesture to indicate that they want spellings associated with a literal or phonetic pronunciation of the detected audio waveforms, for example as opposed to a correct or accepted spelling. The gestures used to activate these modes may be an engagement or cover gesture such as described above, or they may be different gestures. Other gestures may include hand waves, hand movements, or other deliberate movements that gesture detection sensor 122 may be programmed to detect.

Figure 5:
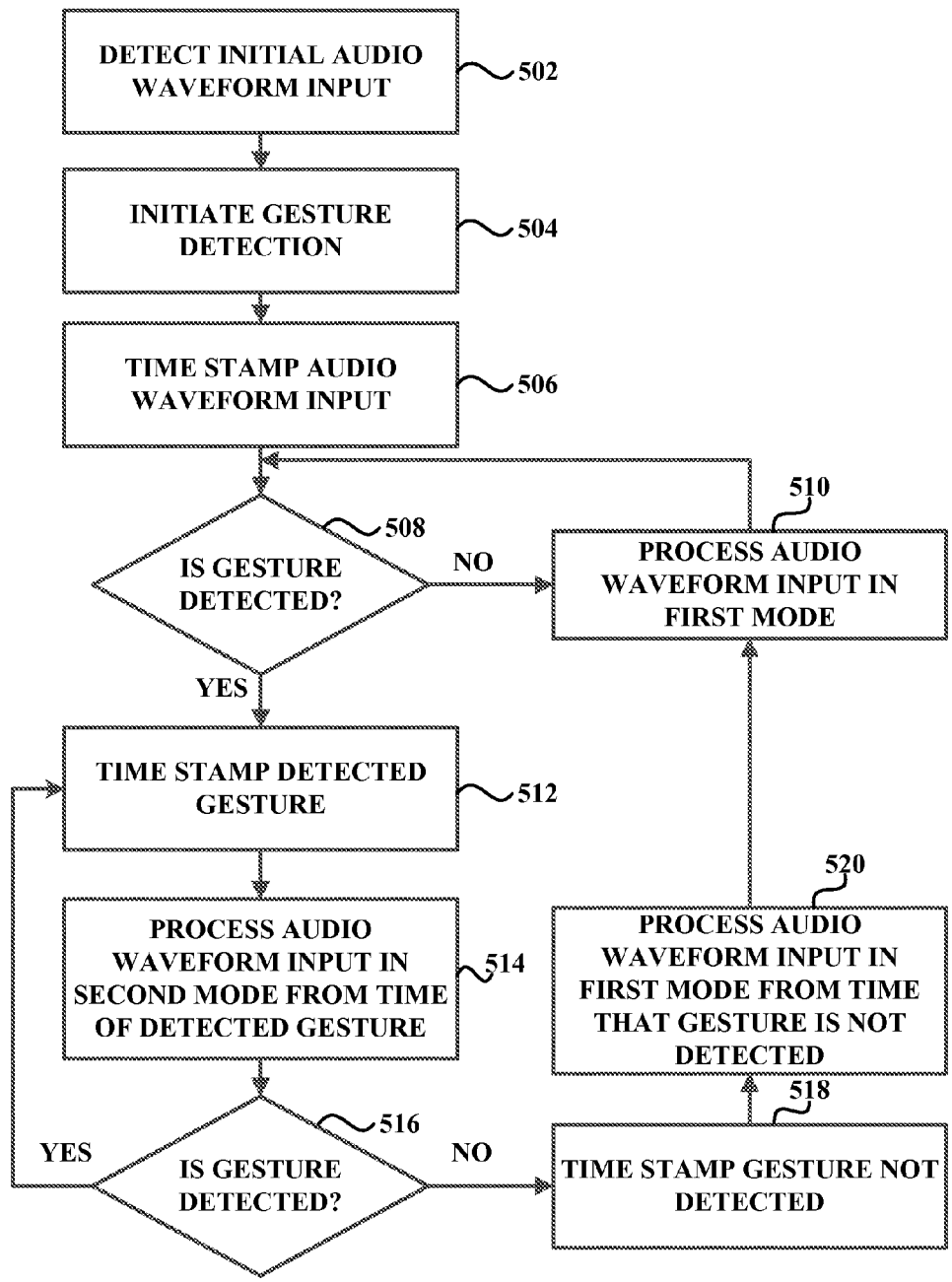
FIG. 5 is a flowchart illustrating a method of processing detected audio waveforms in a first mode and a second mode, consistent with some embodiments.

FIG. 5 is a flowchart illustrating a method of processing detected audio waveforms in a first mode and a second mode, consistent with some embodiments. For the purpose of illustration, FIG. 5 will be described with reference to any of FIGS. 1, 2A-2C, and 3A-3F. The method shown in FIG. 5 may be embodied in computer-readable instructions for execution by one or more processors in processing component 106 of device 100. As shown in FIG. 5, microphone 118 may detect an initial audio waveform input from user 120 (402). According to some embodiments, the audio waveform input may be a voice of user 120 spoken to device 100 for the purposes of voice dictation or voice commanding device 100. The audio waveform detected by microphone 118 may generate an electrical signal that can be processed by processing component 106 according to instructions in any of memories 108, 110, and 112, to determine a meaning of the electrical signal based on a dictionary of meanings. When the initial audio waveform input is detected, device 100 may initiate gesture detection by activating gesture detection sensor 122 (504), or gesture detection may already be on in some embodiments. According to some embodiments, gesture detection sensor 122 may remain inactive to conserve power until an initial audio waveform input is detected. The detected audio waveform input may then be time stamped according to a time received from system clock 124 (506).

Gesture detection sensor 122 may determine if a gesture is detected (508). If a gesture is not detected, processing component 106 may process the detected audio waveform input in a first mode (510). According to some embodiments, processing the detected audio input in a first mode may include processing the detected audio waveform input such that a first meaning corresponding to an electrical signal generated by the detected audio waveform is used by processing component 106. If a gesture is detected by gesture detection sensor 122, the detected gesture is time stamped according to a time received from system clock 124 (512). Processing component 106 may then process the detected audio waveform in a second mode from the time of the detected gesture (514). According to some embodiments, processing the detected audio waveform input in a second mode may include processing the detected audio waveform input according to a second mode, such that a second meaning corresponding to an electrical signal generated by the detected audio waveform is used by processing component 106. The second or alternate meaning may correspond to a command, punctuation, or a homophone of a word. The second or alternate meaning may correspond to a command, punctuation, or a homophone of a word. The second meaning may also allow a user to correct a previous word or letter, or may allow a user to use a literal or phonetic spelling of a word.

Gesture detection sensor 122 will continue to determine if a gesture is detected (516) and as long as a gesture is detected, the gesture will be time stamped (512), and processing component 106 will process the audio waveform input in the second mode from the time of the detected gesture (514). Once a gesture is not detected, the time at which the gesture is no longer detected is time stamped (518), and processing component 106 will begin processing the audio waveform input in the first mode from the time at which the gesture is no longer detected (520). According to some embodiments, processing the detected audio input in the first mode may include processing the detected audio input such that a first meaning corresponding to an electrical signal generated by the detected audio waveform is used by processing component 106. Processing component will continue process the audio waveform input in the first mode (410) until a gesture is detected (408). According to some embodiments, after an audio waveforms input is no longer detected by microphone 118, gesture detection by gesture detection sensor 122 may be stopped in order to conserve power.

Figure 6G:
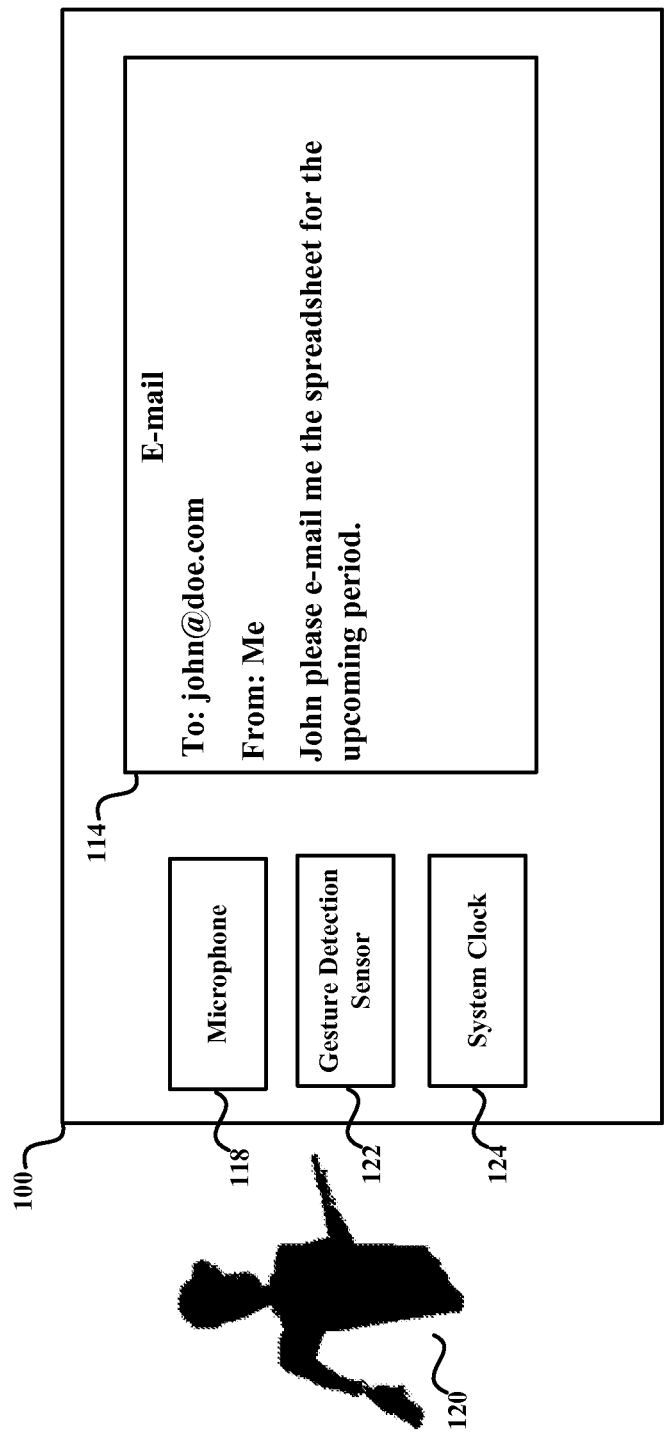

FIGS. 6A-6G illustrate an example of a system processing detected audio waveforms in a first mode and a second mode based on a detected gesture, consistent with some embodiments. The example system shown in FIGS. 6A-6G is similar to the system shown in FIGS. 2A-2C and 3A-3F, except that in the system shown in FIGS. 6A-6G, device 100 processes detected audio waveforms in a second mode after a gesture is detected, and continues to process detected audio waveforms in the second mode until a subsequent gesture is detected. As shown in FIG. 6A, user 120 may make a gesture that is detected by gesture detection sensor 122 having a time stamp determined by system clock 124. According to the example shown in FIGS. 6A-6G, processing component 106 of device may process detected audio waveforms in a second mode from approximately a time stamp of the detected gesture until approximately a time stamp of a subsequent detected gesture.

As shown in FIG. 6B, microphone 118 may detect audio waveforms from user which generate an electrical signal at a time stamp determined by system clock 124. The detected audio waveforms corresponding to the words "E-mail", "John", "at", "doe", "dot", and "com" may have one or more meanings in dictionaries in any of memories 108-112. Since a gesture was detected at a time stamp that is before a time stamp of the detected audio waveforms, and prior to the detection of a subsequent gesture, the audio waveforms may be processed in a second mode, and be given second meanings. The second meanings may be a command or punctuation. According to some embodiments, in the second mode, the word "E-mail" may be given a meaning of a command to generate an e-mail to the e-mail address that follows. The word "John" may not have a second meaning and may be given the same meaning in the second mode as in the first mode. The word "at" may be given a meaning as the punctuation mark "@" in the second mode. The word "doe" may not have a second meaning and may be given the same meaning in the second mode as in the first mode. The word "dot" may be given a meaning as the punctuation mark "." in the second mode. The word "com" may not have a second meaning and may be given the same meaning in the second mode as in the first mode.

As shown in FIG. 6C, user 120 makes a gesture that may be detected by gesture detection sensor 122 and may have a time stamp according to system clock 124. Processing component 106 of device 100 may process subsequent detected audio waveforms according to a first mode, such that detected audio waveforms are given a first meaning by processing component 106 from the time stamp associated with the detected gesture. As shown in FIG. 6D, microphone 118 may detect audio waveforms from the user which generate an electrical signal at a time stamp determined by system clock 124. The detected audio waveforms corresponding to the words "John", "please", "e-mail", "me", "the", "spreadsheet", "for", "the", "upcoming", and "period" may have one or more meanings in dictionaries in any of memories 108-112. Since a subsequent gesture was detected at a time stamp that is before a time stamp of the detected audio waveforms, the audio waveforms may be processed in a first mode, and be given first meanings. The first meanings may correspond to text displayed by display component 114.

As shown in FIG. 6E, user 120 makes a gesture that may be detected by gesture detection sensor 122 and may have a time stamp according to system clock 124. Processing component 106 of device 100 may process subsequent detected audio waveforms according to a second mode, such that detected audio waveforms are given a second meaning by processing component 106 from the time stamp associated with the detected gesture. As shown in FIG. 6E, microphone 118 may detect audio waveforms from the user which generate an electrical signal at a time stamp determined by system clock 124. The detected audio waveforms corresponding to the word "period" may have one or more meanings in dictionaries in any of memories 108-112. Since a gesture was detected at a time stamp that is before a time stamp of the detected audio waveforms, and before a subsequent gesture has been detected, the audio waveforms may be processed in a second mode, and be given a second meaning. The second meaning may correspond to punctuation associated with the detected audio waveforms.

FIG. 6G is illustrates the result of FIGS. 6A-6F. As shown in FIG. 6G, An E-mail message to john@doe.com has been created that includes the message "John please e-mail me the spreadsheet for the upcoming period." As shown in FIGS. 6A-6G, the words "e-mail" and "period" may have at least a first meaning in a first mode and a second meaning in a second mode, wherein user 120 can specify the mode and, thus, the meaning, by using a gesture. Although FIGS. 6A-6G have been described with a first mode corresponding to text and a second mode corresponding to a command or punctuation, additional modes may also be included. The additional modes may include a correction mode or a literal or phonetic sounding mode. These additional modes may be instead of the depicted second mode, or in addition thereto.

Figure 7:
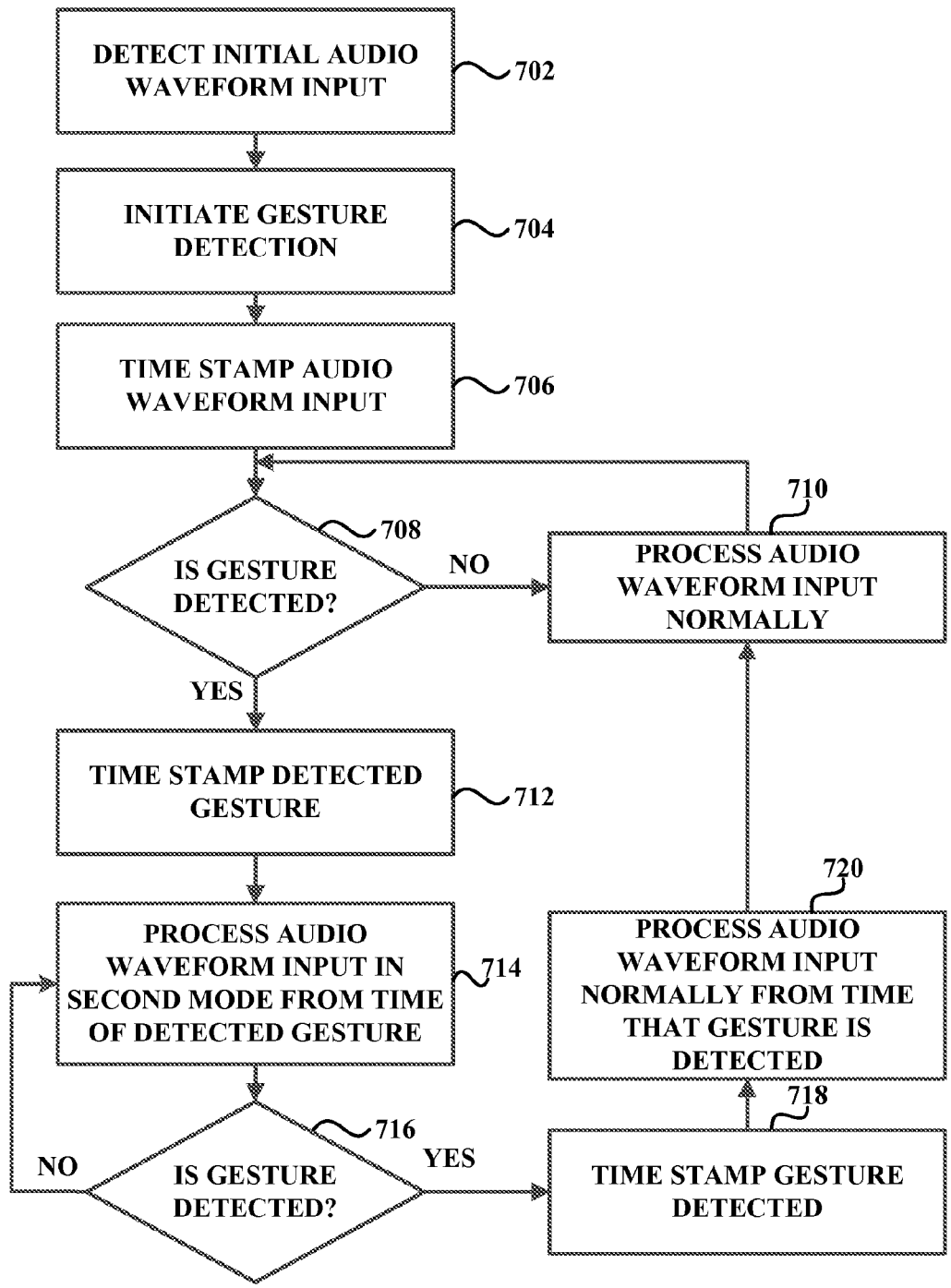
FIG. 7 is a flowchart illustrating a method of processing detected audio waveforms in a first mode and a second mode, consistent with some embodiments.

FIG. 7 is a flowchart illustrating a method of processing detected audio waveforms in a first mode and a second mode, consistent with some embodiments. For the purpose of illustration, FIG. 7 will be described with reference to any of FIGS. 1 and 6A-6G. The method shown in FIG. 7 may be embodied in computer-readable instructions for execution by one or more processors in processing component 106 of device 100. As shown in FIG. 7, microphone 118 may detect an initial audio waveform input from user 120 (702). According to some embodiments, the audio waveform input may be a voice of user 120 spoken to device 100 for the purposes of voice dictation or voice commanding device 100. The audio waveform detected by microphone 118 may generate an electrical signal that can be processed by processing component 106 according to instructions in any of memories 108, 110, and 112, to determine a meaning of the electrical signal based on a dictionary of meanings. When the initial audio waveform input is detected, device 100 may initiate gesture detection by activating gesture detection sensor 122 (704), or gesture detection may already be on in some embodiments. According to some embodiments, gesture detection sensor 122 may remain inactive to conserve power until an initial audio waveform input is detected. The detected audio waveform input may then be time stamped according to a time received from system clock 124 (706).

Gesture detection sensor 122 may determine if a gesture is detected (708). If a gesture is not detected, processing component 106 may process the detected audio waveform input in a first, normal, and/or default mode (710). According to some embodiments, processing the detected audio input in a first mode may include processing the detected audio waveform input such that a first meaning corresponding to an electrical signal generated by the detected audio waveform is used by processing component 106. If a gesture is detected by gesture detection sensor 122, the detected gesture is time stamped according to a time received from system clock 124 (712). Processing component 106 may then process the detected audio waveform in a second mode from the time stamp of the detected gesture (714). According to some embodiments, processing the detected audio waveform input in a second mode may include processing the detected audio waveform input according to a second mode, such that a second meaning corresponding to an electrical signal generated by the detected audio waveform is used by processing component 106. The second or alternate meaning may correspond to a command, punctuation, or a homophone of a word. The second meaning may also allow a user to correct a previous word or letter, or may allow a user to use a literal or phonetic spelling of a word, for example.

Gesture detection sensor 122 will continue to determine if a gesture is detected (716), and processing component 106 will process the audio waveform input in the second mode from the time of the detected gesture (714). In the embodiment illustrated in FIG. 7, processing the audio waveform input in the second mode may continue until a subsequent gesture is detected. Once a subsequent gesture is detected, the time at which the subsequent gesture is detected is time stamped (718), and processing component 106 will begin processing the audio waveform input in the first mode from the time at which the subsequent gesture is detected (720). According to some embodiments, processing the detected audio input in the first mode may include processing the detected audio input such that a first meaning corresponding to an electrical signal generated by the detected audio waveform is used by processing component 106. The processing component 106 may continue process the audio waveform input in the first mode (710) until another gesture is detected (708). The method shown in FIG. 7 may allow user 120 to switch to a second mode with a gesture, and then switch back to the first mode with a gesture, for example the same gesture or another gesture such as a mode end gesture. Although FIG. 7 describes switching between a first mode and a second mode with a gesture, additional gestures may be detected by gesture detection sensor for switching to additional modes.

For example, additional modes may include a correction mode. For example, user 120 may be able to enter a correction mode where certain words are given a meaning in the correction mode that allows a user to correct a word that has been displayed as text on display component 114. Such words may include "delete", "fix", "I mean", "I meant", "oops", "correct", "back", and "replace". These words, when processed in a correction mode indicated by a detected gesture may be given a second meaning that deletes or replaces a previous word. In some embodiments, these words are only processed in the correction mode when accompanied by a certain gesture, for example a short left swipe gesture.

Additional modes may include a literal or phonetic translation mode. For example, certain detected audio waveforms may have a spelling that is different from a first or normal spelling, that corresponds to a literal or phonetic spelling. In some embodiments, a literal or phonetic spelling may be automatically corrected by processing component 106 and given a first or normal spelling. For example, if user says "playa" either as a mispronunciation of the Spanish word or as an English slang term, processing component may have a spelling for this word which corresponds to the correct English term of "player". This word may have a second spelling that is the slang word or the Spanish word for beach, and user 120 can specifically indicate that that is the desired spelling by making a gesture.

These additional modes may correspond to a second mode, as referred to in the figures, or a third, fourth, or any additional mode. Consistent with some embodiments, electrical signals corresponding to detected audio waveforms may be given one or more meanings in dictionaries stores in any of memories 108-112. Some audio waveforms may have two meanings, where a gesture can be used to switch between the meanings. Some audio waveforms may have multiple meanings, where multiple gestures may be used to switch between the meanings. The meanings may include punctuation, commands, corrections, and literal or phonetic meanings, as described above. The meanings may also correspond to groups corresponding to certain words. For example the word "friends" may have a first meaning that displays the text of the word on display component 114. The word may also have a second meaning that refers to a group of contacts that have been labeled as friends, such that user 120 making a gesture and saying "e-mail friends" could be interpreted as a command to create an e-mail to all contacts labeled as "friends". The second or alternate meanings may also be user-defined, so that user 120 can apply a different meaning to a word or phrase and then switch to this meaning by making a gesture.

Software, in accordance with the present disclosure, such as program code and/or data, may be stored on one or more machine readable mediums, including non-transitory machine readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Consequently, embodiments as described herein may provide an improvement over current voice dictation solutions by allowing for a user to specify using a gesture when a word or word string is supposed to be processed in an alternate mode to have an alternate meaning such as a command, a punctuation mark, or an action. Moreover, by switching between modes by comparing time stamps of words and gestures, embodiments as described herein may provide systems and methods that provide more accuracy when switching modes and are able to take into account any latency introduced by the user when making a gesture. The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system for processing detected audio waveforms in a first mode and a second mode, comprising:
   a microphone configured for detecting one or more audio waveforms;
   a gesture detection sensor configured to detect one or more touchless gestures corresponding to different processing modes;
   a system clock configured to provide time stamps for the one or more audio waveforms detected by the microphone and time stamps for the one or more touchless gestures detected by the gesture detection sensor, the time stamps for the one or more touchless gestures indicating a starting time and an ending time of each detected touchless gesture;
   a buffer configured to store the one or more audio waveforms and information regarding the one or more touchless gestures; and
   one or more processors configured to enter the second mode and selectively process a detected audio waveform stored in the buffer in the second mode when a time stamp of the detected audio waveform is between a first time stamp of a first touchless gesture corresponding to the second mode detected by the gesture detection sensor and a second time stamp associated with one of the one or more touchless gestures.

2. The system of claim 1, wherein the one or more processors are further configured to process a detected audio waveform in the first mode when a time stamp of the detected audio waveform is before the first time stamp or after the second time stamp.

3. The system of claim 1, further comprising a memory storing first meanings for detected audio waveforms processed in the first mode and second meanings for some detected audio waveforms processed in the second mode.

4. The system of claim 3, wherein the second meanings comprise at least one of a command, a punctuation mark, or an action.

5. The system of claim 4, wherein the first meanings comprise text associated with the detected audio waveforms.

6. The system of claim 1, wherein the gesture detection sensor comprises at least one of a camera, an ultrasound transducer, a shadow detector, or an infrared sensor.

7. The system of claim 1, further comprising a display, the display configured to display feedback indicating when the detected audio waveform is being processed in the second mode.

8. The system of claim 1,
wherein each of the one or more touchless gestures corresponds to a respective mode of a plurality of modes, and
wherein the one or more processors are configured to selectively process an audio waveform detected by the microphone in one mode of the plurality of modes when:
a time stamp of the detected audio waveform is between a time stamp corresponding to a start of one touchless gesture of the one or more touchless gestures corresponding to the one mode detected by the gesture detection sensor and a time stamp corresponding to an end of the one touchless gesture; or
a time stamp of the detected audio waveform is between the time stamp corresponding to the start of the one touchless gesture and a time stamp corresponding to a start of a next detected touchless gesture.

9. The system of claim 8, wherein the plurality of modes includes at least one of a correction mode, a command mode, or a translation mode.

10. The system of claim 1, wherein the detected audio waveforms are provided to the one or more processors from the buffer for processing based on the one or more touchless gestures detected by the gesture detection sensor.

11. The system of claim 1, wherein the one or more processors are configured to enable a gesture detection procedure using the gesture detection sensor when the microphone detects an audio waveform.

12. The system of claim 11, wherein the gesture detection sensor is inactive until the detected audio waveform is determined to be a human voice.

13. The system of claim 1, wherein the second mode includes one of a correction mode, a command mode, or a translation mode.

14. The system of claim 1,
wherein the first time stamp of the first touchless gesture corresponds to a start of the first touchless gesture; and
wherein the second time stamp corresponds to an end of the first touchless gesture.

15. The system of claim 1,
wherein the first time stamp of the first touchless gesture corresponds to a start of the first touchless gesture; and
wherein the second time stamp corresponds to a start of a next detected touchless gesture corresponding to the first mode.

16. The system of claim 1, wherein the time stamps for the one or more audio waveforms are captured at pauses between words.

17. The system of claim 1, wherein the time stamps for the one or more audio waveforms are captured at a beginning and an end of a string including multiple words, and time stamps for individual words are determined by interpolating the time stamps captured at the beginning and the end of the string.

18. A method for processing detected audio waveforms in a first mode and a second mode, comprising:
detecting, by a microphone, one or more audio waveforms;
time stamping the detected one or more audio waveforms;
detecting, by a gesture detection sensor, one or more touchless gestures corresponding to one or more modes;
time stamping a starting time and an ending time of each of the detected one or more touchless gestures;
storing, in a buffer, the one or more audio waveforms and information regarding the one or more touchless gestures; and
entering the second mode and selectively processing, by one or more processors coupled to the microphone, an audio waveform of the one or more audio waveforms in the second mode when a time stamp of the audio waveform is between a first time stamp of a first touchless gesture corresponding to the second mode detected by the gesture detection sensor and a second time stamp associated with one of the one or more touchless gestures.

19. The method of claim 18,
wherein the first time stamp of the first touchless gesture corresponds to a start of the first touchless gesture; and
wherein the second time stamp corresponds to an end of the first touchless gesture or a start of a next detected touchless gesture corresponding to the first mode.

20. The method of claim 18, further comprising processing the audio waveform in the first mode when a time stamp of the audio waveform is before the first time stamp or after the second time stamp.

21. The method of claim 18, wherein processing the audio waveform in the second mode comprises correlating the audio waveform with a meaning that is different from a first meaning corresponding to the first mode.

22. The method of claim 21, wherein the meaning that is different from the first meaning comprises at least one of a command, a punctuation mark, or an action.

23. The method of claim 22, wherein the first meaning comprises text associated with the audio waveform.

24. The method of claim 18, wherein detecting the one or more touchless gestures comprises detecting if the one or more touchless gestures are performed using at least one of a camera, an ultrasound transducer, a shadow detector, or an infrared sensor.

25. The method of claim 18, wherein processing the audio waveform in the second mode comprises generating audio or visual feedback indicating that the audio waveform is being processed in the second mode.

26. The method of claim 18,
wherein each of the one or more touchless gestures corresponds to a respective mode of the one or more modes, and
wherein selectively processing comprises selectively processing the audio waveform in a mode of the one or more modes corresponding to one touchless gesture of the one or more touchless gestures when:

a time stamp of the audio waveform is between a time stamp corresponding to a start of the one touchless gesture detected by the gesture detection sensor and a time stamp corresponding to an end of the one touchless gesture; or a time stamp of the audio waveform is between the time stamp corresponding to the start of the one touchless gesture and a time stamp corresponding to a start of a next detected touchless gesture of the one or more touchless gestures.

27. The method of claim 18, further comprising:
providing the one or more audio waveforms from the buffer when the one or more touchless gestures are detected.

28. The method of claim 18, further comprising enabling a gesture detection procedure in response to the microphone detecting an audio waveform.

29. A non-transitory computer-readable medium including instructions that, when executed by one or more processors, cause the one or more processors to perform a method for processing detected audio waveforms in a first mode and a second mode, the method comprising:
detecting one or more audio waveforms;
time stamping the detected one or more audio waveforms;
detecting one or more touchless gestures corresponding to one or more modes;
time stamping a starting time and an ending time of each of the detected one or more touchless gestures;
storing, in a buffer, the one or more audio waveforms and information regarding the one or more gestures; and
entering the second mode and selectively processing an audio waveform of the one or more audio waveforms in the second mode when a time stamp of the audio waveform is between a first time stamp of a first touchless gesture of the one or more touchless gestures corresponding to the second mode detected by the gesture detection sensor and a second time stamp associated with one of the one or more touchless gestures.

30. A system for processing detected audio waveforms in a first mode and a second mode, comprising:
means for detecting one or more audio waveforms and time stamping the one or more audio waveforms;
means for detecting one or more touchless gestures corresponding to one or more modes and time stamping a starting time and an ending time of each of the detected one or more touchless gestures;
means for storing the one or more audio waveforms and information regarding the one or more gestures; and
means for entering the second mode and selectively processing an audio waveform from the one or more audio waveforms in the second mode when a time stamp of the audio waveform is between a first time stamp of a first detected touchless gesture of the one or more touchless gestures corresponding to the second mode and a second time stamp associated with one of the one or more touchless gestures.

31. The system of claim 30,
wherein the first time stamp of the first detected touchless gesture corresponds to a start of the first detected touchless gesture; and
wherein the second time stamp corresponds to an end of the first detected touchless gesture or a start of a next detected touchless gesture corresponding to the first mode.

32. The system of claim 30, wherein the means for selectively processing processes the audio waveform in the first mode when a time stamp of the audio waveform is before the first time stamp or after the second time stamp.

33. The system of claim 30, wherein the means for selectively processing processes the audio waveform in the second mode by correlating the audio waveform with a second meaning that is different from a first meaning corresponding to the first mode.

34. The system of claim 33, wherein the second meaning that is different from the first meaning comprises at least one of a command, a punctuation mark, or an action.

35. The system of claim 34, wherein the first meaning comprises text associated with the audio waveform input.

36. The system of claim 30, wherein the means for detecting the one or more touchless gestures comprises at least one of a camera, an ultrasound transducer, a shadow detector, or an infrared sensor.

37. The system of claim 30, wherein the means for selectively processing generates audio or visual feedback indicating that the audio waveform is being processed in the second mode.

38. The system of claim 30,
wherein each of the one or more touchless gestures corresponding to a respective mode of the one or more modes, and
wherein the means for selectively processing comprises selectively processing the audio waveform in a mode of the one or more modes corresponding to one touchless gesture of the one or more touchless gestures when:
a time stamp of the audio waveform is between a time stamp corresponding to a start of the one touchless gesture detected by the gesture detection sensor and a time stamp corresponding to an end of the one touchless gesture; or
a time stamp of the audio waveform is between the time stamp corresponding to the start of the one touchless gesture and a time stamp corresponding to a start of a next detected touchless gesture of the one or more touchless gestures.

39. The system of claim 30,
wherein the means for storing the audio waveforms provides the stored audio waveforms to the means for selectively processing when the means for detecting the one or more touchless gestures detects the one or more touchless gestures.

* * * * *